United States Patent
Seo et al.

(10) Patent No.: US 8,799,542 B2
(45) Date of Patent: Aug. 5, 2014

(54) SYSTEM AND METHOD FOR PROVIDING REMOTE DEVICE DRIVER

(75) Inventors: Hyung Su Seo, Gyeonggi-do (KR); Jong Ho Kim, Seoul (KR)

(73) Assignee: RSUPPORT Co. Ltd, Seoul (KR)

( * ) Notice: Subject to any disclaimer, the term of this patent is extended or adjusted under 35 U.S.C. 154(b) by 0 days.

(21) Appl. No.: 13/523,734

(22) Filed: Jun. 14, 2012

(65) Prior Publication Data

US 2013/0007317 A1    Jan. 3, 2013

(30) Foreign Application Priority Data

Jul. 1, 2011    (KR) .................. 10-2011-0065462

(51) Int. Cl.
*G06F 13/12*     (2006.01)
*G06F 15/177*    (2006.01)
*G06F 13/10*     (2006.01)

(52) U.S. Cl.
CPC ...... *G06F 13/102* (2013.01); *G06F 2213/0042* (2013.01)
USPC .......................................... 710/63; 709/220

(58) Field of Classification Search
CPC ............................ G06F 9/4445; H04L 67/025
See application file for complete search history.

(56) References Cited

U.S. PATENT DOCUMENTS

2003/0195951 A1*   10/2003   Wittel et al. .................. 709/220

FOREIGN PATENT DOCUMENTS

| JP | 2006/195981 A | 7/2006 |
|---|---|---|
| JP | 2008/146398 A | 6/2008 |
| JP | 2008/210115 A | 9/2008 |
| KR | 20060056743 A | 5/2006 |
| KR | 100619942 B1 | 9/2006 |
| KR | 100821167 B1 | 4/2008 |

OTHER PUBLICATIONS

English abstract for Korean Patent Application Registration No. 10-0619942 (1 page).
English abstract for Korean Patent Application Registration No. KR10-206-0056743 (1 page).
English abstract for Korean Patent Application Registration No. KR10-0821167 (1 page).
English Abstract for Japanese Patent Publication No. JP2008-210115 (1 page).
English Abstract for Japanese Patent Publication No. JP2008-146398 (1 page).
English Abstract for Japanese Patent Publication No. JP2006-195981 (1 page).

* cited by examiner

*Primary Examiner* — Hyun Nam
(74) *Attorney, Agent, or Firm* — Osha Liang LLP

(57) ABSTRACT

Provided is a system and method for providing a remote device driver. The system includes a first device configured to request device information from a terminal connected through a universal serial bus (USB) interface and transmit device information provided from the terminal in response to the request via a network, and a second device connected with the first device via the network and configured to load a driver for driving the terminal on the basis of the device information on the mobile terminal received from the first device. Accordingly, it is possible to drive and control a mobile terminal at a remote location without installing a function driver directly on a computer that is physically connected with the mobile terminal.

6 Claims, 3 Drawing Sheets

SYSTEM AND METHOD FOR PROVIDING REMOTE DEVICE DRIVER

CLAIM FOR PRIORITY

This application claims priority to Korean Patent Application No. 10-2011-0065462 filed on Jul. 1, 2011 in the Korean Intellectual Property Office (KIPO), the entire contents of which are hereby incorporated by reference.

BACKGROUND OF INVENTION

1. Technical Field

Example embodiments of the present invention relate in general to a device driver, and more particularly, to a system and method for providing a remote device driver for driving a device connected through universal serial bus (USB).

2. Related Art

As the standard of input/output (I/O) interfaces connecting computers with peripherals, a USB interface has advantages such as ease of use, high-speed communication, high stability, generality, low implementation cost, low power consumption, and support for various operating systems (OSs).

Due to these advantages, the USB interface is being widely used as a connection means of a digital camera, an external storage device, a mobile communication terminal, etc. as well as computer I/O devices, such as a keyboard, mouse, printer and scanner.

A computer and peripherals connected through the USB interface operate as a host and devices, respectively. A plurality of devices may be connected to one host.

Lately, with the development of processors, memory technology and communication technology, a mobile communication terminal having voice and video telephony functions, and also various functions such as still photography, motion picture photography, and Internet access, has been commercialized, and the USB interface with excellent communication speed, convenience, generality and extendability is used as a communication means between a personal computer (PC) and a mobile communication terminal.

For example, when a user upgrades an OS or firmware installed on a mobile communication terminal, or installs, removes or updates an application in the mobile communication terminal while using the mobile communication terminal, the user should first connect the mobile communication terminal to a computer through the USB interface, and then perform a desired operation through the computer.

At this time, the device driver of the mobile communication terminal should be installed on the computer such that the computer can recognize the mobile communication terminal as a USB device and perform normal communication after the computer and the mobile communication terminal are physically connected through the USB interface.

Since it is practically impossible to include the device drivers of all mobile communication terminals that are currently on sale in the OS of a computer, a user of a mobile communication terminal should obtain and install in person a device driver provided by the manufacturer or a seller of the corresponding device in a computer. Due to the ongoing advancement of functions of a mobile communication terminal, the process of installing a device driver in a computer is also becoming complex.

However, most users physically connect mobile communication terminals to computers through USB and install device drivers. Since most users do not accurately know the process of controlling mobile communication terminals through computers, there is inconvenience in use. Also, when the aforementioned process is incorrectly performed, there is a high probability that data stored in a mobile communication terminal will be deleted, or a serious error will occur.

SUMMARY OF INVENTION

Accordingly, example embodiments of the present invention are provided to substantially obviate one or more problems due to limitations and disadvantages of the related art.

Example embodiments of the present invention provide a remote device driver providing method that can remotely build a device driver corresponding to a device connected through universal serial bus (USB) without user intervention.

Example embodiments of the present invention also provide a system for performing the remote device driver providing method.

In some example embodiments, a system for providing a remote device driver includes: a first device configured to request device information from a terminal connected through a USB interface, and transmit device information provided from the terminal in response to the request via a network; and a second device connected with the first device via the network, and configured to load a driver for driving the terminal on the basis of the device information on the mobile terminal received from the first device.

Here, the first device may include a USB filter driver configured to check whether or not the terminal is connected, and when the terminal is connected, establish a communication channel with the terminal, request the device information from the terminal, and receive the device information from the terminal.

Here, the second device may include: a virtual hub driver configured to exchange data with the USB filter driver through a logical communication channel established with the USB filter driver; and a function driver configured to perform communication limited to the terminal and manage communication of the virtual hub driver.

Here, the USB filter driver and the virtual hub driver between which the logical communication channel is established may exchange the data through a specific application installed on each of the first device and the second device.

Here, when a request for the terminal is provided from a predetermined application installed on the second device, the function driver may transfer the provided request to the virtual hub driver, the virtual hub driver may transmit the request to the USB filter driver through the logical communication channel, and the USB filter driver may provide data corresponding to the request to the terminal through a hub driver and a host controller.

In other example embodiments, a method of providing a remote device driver includes: requesting, at a first device to which a terminal is connected through USB, device information from the terminal; transmitting, at the first device, device information received from the terminal to a second device; and loading, at the second device, a function driver of the terminal on the basis of the device information received from the first device.

Here, transmitting, at the first device, the device information received from the terminal to the second device may include transmitting, at a first application installed on the first device, the device information to the second device.

Here, loading, at the second device, the function driver of the terminal on the basis of the device information received from the first device may include: receiving, at a second application installed on the second device, the device information from the first application and providing the received device information to an operating system (OS); searching for, at the OS, the function driver corresponding to the device information; and loading, at the OS, the searched function driver into a memory.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Figure 1:
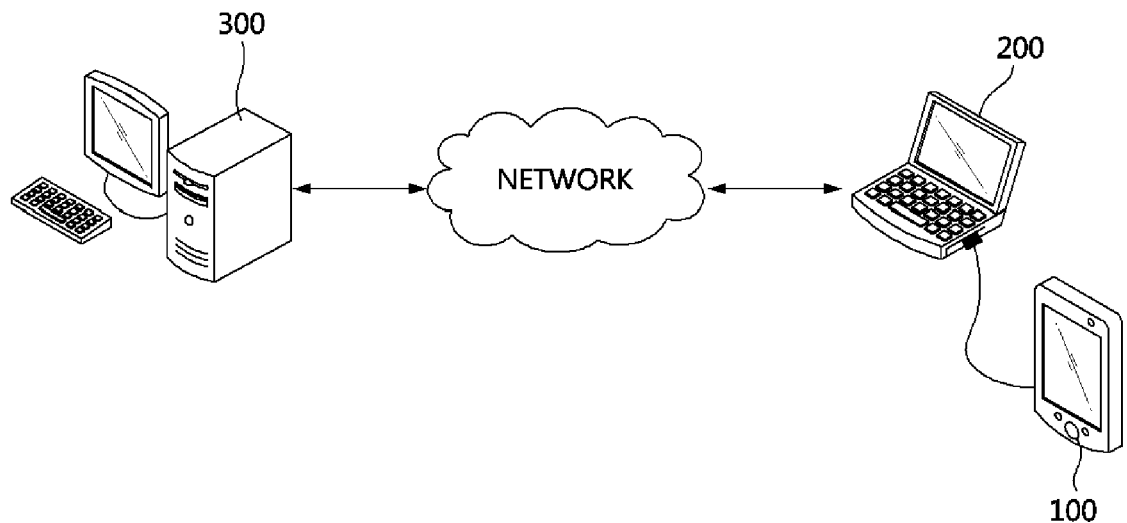
FIG. 1 is a conceptual diagram showing a constitution of a system for providing a remote device driver according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. To aid in understanding the present invention, like numbers refer to like elements throughout the description of the figures, and the description of the same component will not be reiterated.

FIG. 1 is a conceptual diagram showing a constitution of a system for providing a remote device driver according to an example embodiment of the present invention.

Referring to FIG. 1, a system for providing a remote device driver according to an example embodiment of the present invention includes a mobile terminal 100, a first computer 200 connected with the mobile terminal 100 through a universal serial bus (USB) interface, and a second computer 300 that is at a remote location and connected with the first computer 200 via a wired or wireless network.

The mobile terminal 100 is a device that performs a function of a USB device, and may be, for example, a mobile communication terminal such as a smart phone, a cellular phone and a personal digital assistant (PDA), or various digital information processing terminals such as a portable multimedia player (PMP) and a smart player.

The mobile terminal 100 is physically connected with the first computer 200 through a USB cable or wireless USB by a user, and performs the corresponding operation in response to a request or command of the first computer 200. For example, after physically connected with the first computer 200 through the USB interface, the mobile terminal 100 provides the corresponding data in response to a standard request made by the first computer 200 that functions as a physical host. Also, in response to a command and/or data provided from the first computer 200, the mobile terminal 100 may perform an operation of updating an operating system (OS) or firmware, or installing, updating or removing an application.

The first computer 200 functions as a physical host of the mobile terminal 100 connected through USB.

Specifically, the first computer 200 determines whether a mobile terminal is connected to a USB port. When it is determined that the mobile terminal 100 is connected, the first computer 200 establishes a temporary communication path with the second computer 300 via the network, and then requests device information (e.g., a device descriptor) from the mobile terminal 100.

When a response to the device information request is received from the mobile terminal 100, the first computer 200 transmits the received information (the device descriptor) to the second computer 300 via the network. Here, the device information on the mobile terminal 100 may be information, for example, a vendor identification (ID) and a product ID, that enables identification of the mobile terminal 100.

The second computer 300 is connected with the first computer 200 via the wired or wireless network and functions as a virtual host that substantially drives a mobile terminal physically connected with the first computer 200.

Specifically, the second computer 300 receives the device information on the mobile terminal 100 from the first computer 200 via the network, searches for an optimum function driver for communicating with the mobile terminal 100 on the basis of the received device information on the mobile terminal 100, and loads the searched function driver into a memory.

When the device driver of the mobile terminal 100 is loaded through communication between the first computer 200 functioning as the physical host of the mobile terminal 100 and the second computer 300 functioning as the substantial host of the mobile terminal 100, an application executed on the second computer 300 may recognize the mobile terminal 100 as if the mobile terminal 100 has been connected with the second computer 300, and access the mobile terminal 100.

Figure 2:
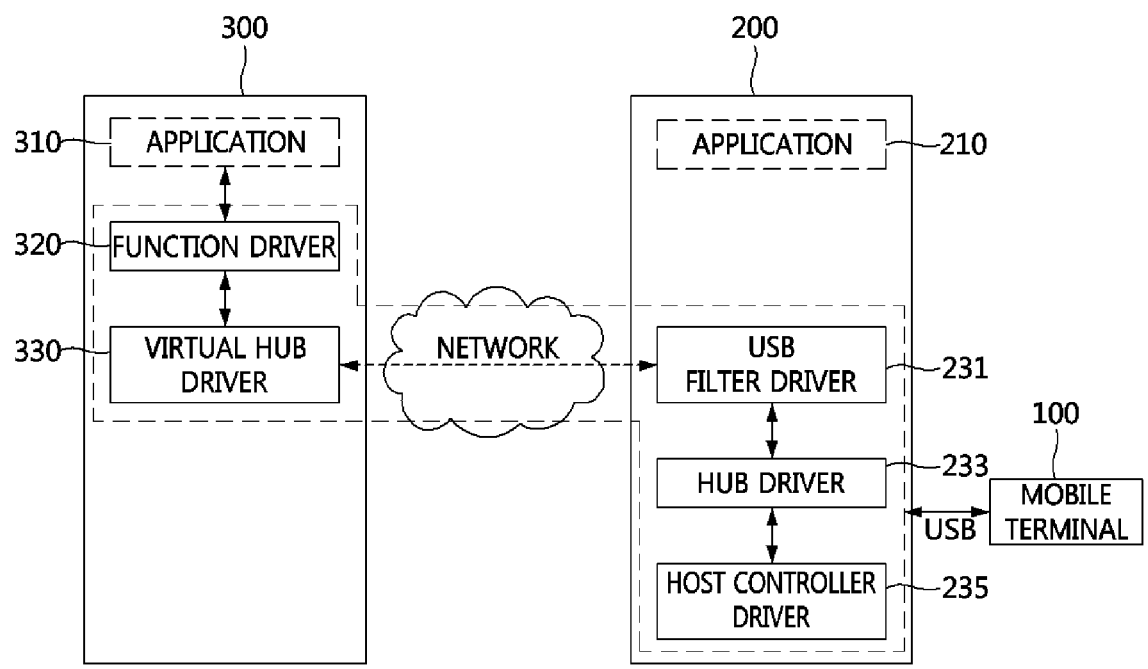
FIG. 2 shows function blocks of a system for providing a remote device driver according to an example embodiment of the present invention.

FIG. 2 shows function blocks of a system for providing a remote device driver according to an example embodiment of the present invention.

Referring to FIG. 2, a first computer 200 functioning as a physical host of a mobile terminal 100, which is a USB device, includes a USB filter driver 231, and a hub driver 233 and a host controller driver 235 as lower layers of the USB filter driver 231.

Meanwhile, a second computer 300 that is connected with the first computer 200 via a network and functions as a substantial host of the mobile terminal 100 includes a function driver 320 in a lower layer of an application 310 and a virtual hub driver 330 that is in a lower layer of the function driver 320 and communicates with the USB filter driver 231 of the first computer 200.

As shown in FIG. 2, the function driver 320, the virtual hub driver 330, the USB filter driver 231, the hub driver 233 and the host control driver 235 are hierarchically built as a remote device driver according to an example embodiment of the present invention.

A function of the hierarchical device driver built on the first computer 200 and the second computer 300 will be described in detail below with reference to FIG. 2.

The USB filter driver 231 is in an upper layer of the hub driver 233 and manages communication of the hub driver 233. When the mobile terminal 100 is connected with the first computer 200, the USB filter driver 231 recognizes connection of the mobile terminal 100 through the host controller driver 235 and the hub driver 233 in its lower layers, receives device information on the mobile terminal 100 provided from the hub driver 233, and provides the received device information to the virtual hub driver 330 of the second computer 300 logically connected via the network.

Here, the USB filter driver 231 may provide the device information to an OS of the first computer 200. The OS may compare the device information with information (e.g., registry information) stored in the system to determine whether there is a function driver of the mobile terminal 100. When there is a function driver of the mobile terminal 100, the OS may read and load the function driver into a memory.

The hub driver 233 receives a request from the second computer 300 through the USB filter driver 231 in its upper layer, transfers the request to the mobile terminal 100 through the host controller driver 235 in its lower layer, receives a response from the mobile terminal 100 through the host controller driver 235, and transfers the response to the USB filter driver 231.

The host control driver 235 manages communication between the hub driver 233 and USB devices connected with a hub. In other words, the host controller driver 235 transfers data provided from the hub driver 233 to the mobile terminal 100. Also, data provided from the mobile terminal 100 toward the hub driver 233 is provided to the host controller driver 235, and the host controller driver 235 transfers the provided data to the hub driver 233 in its upper layer.

Meanwhile, the application 310 of the second computer 300 may communicate with the remote device driver according to an example embodiment of the present invention using a function supported by an OS.

The function driver 320 (or a USB client driver) manages communication between the application 310 in its upper layer and the virtual hub driver 320 in its lower layer.

The function driver 320 may be configured as at least one file, and may be, for example, a class driver provided by a manufacturer of the mobile terminal 100. The class driver manages communication limited to the mobile terminal 100 or a class of the mobile terminal 100. For example, the function driver 320 receives a request to a USB device from the OS and transfers the request information to the virtual hub driver 330.

The function driver 320 and the virtual hub driver 330 may communicate with each other using a separately prepared format (e.g., input/output (I/O) request packet).

The virtual hub driver 330 establishes a logical communication channel with the USB filter driver 231 via the network, receives the device information on the mobile terminal 100 provided from the hub driver 233 of the first computer 200 through the communication channel, and provides the received device information to the OS of the second computer 300, such that the OS of the second computer 300 can load the function driver 320 of the mobile terminal 100 into a memory on the basis of the device information on the mobile terminal 100 in an enumeration process of the OS of the second computer 300.

Also, the virtual hub driver 330 transmits the request provided from the function driver 320 in its upper layer to the USB filter driver 231 through the communication channel.

Here, the USB filter driver 231 and the virtual hub driver 330 may establish the logical communication channel through specific applications respectively installed in the first computer 200 and the second computer 300 in advance, and the specific applications installed on the first computer 200 may be configured to transmit data provided from the USB filter driver 231 to the second computer 300 via the network, and provide data received from the virtual hub driver 330 of the second computer 300 to the USB filter driver 231.

Also, the specific application installed on the second computer 300 may be configured to transmit data provided from the virtual hub driver 330 to the first computer 200 via the network, and provide data received from the USB filter driver 231 of the first computer 200 to the virtual hub driver 330.

In particular, when the USB filter driver 231 receives the device information from the mobile terminal 100, the specific application installed on the first computer 200 transmits the device information to the second computer 300, and the specific application installed on the second computer 300 receives and provides the device information to the OS through the virtual hub driver 330, such that the OS can search for a function driver corresponding to the device information.

As shown in FIG. 2, in the system for providing a remote device driver according to an example embodiment of the present invention, the USB filter driver 231, the hub driver 233 and the host controller driver 235 are in the first computer 200 physically connected with the mobile terminal 100, and the virtual hub driver 330 and the function driver 320 are hierarchically built on the second computer 300 present at a remote location via a network. Thus, it is possible to access the mobile terminal 100 via the second computer 300 at a remote location without installing a function driver corresponding to the mobile terminal 100 directly on the first computer 200 physically connected with the mobile terminal 100.

Also, in the system for providing a remote device driver according to an example embodiment of the present invention, the second computer 300 can access and control the mobile terminal 100 substantially connected with the first computer 200 as if the mobile terminal 100 has been directly connected with the second computer 300. Thus, the system can be used in a variety of application fields such as remote control of a mobile terminal.

Figure 3:
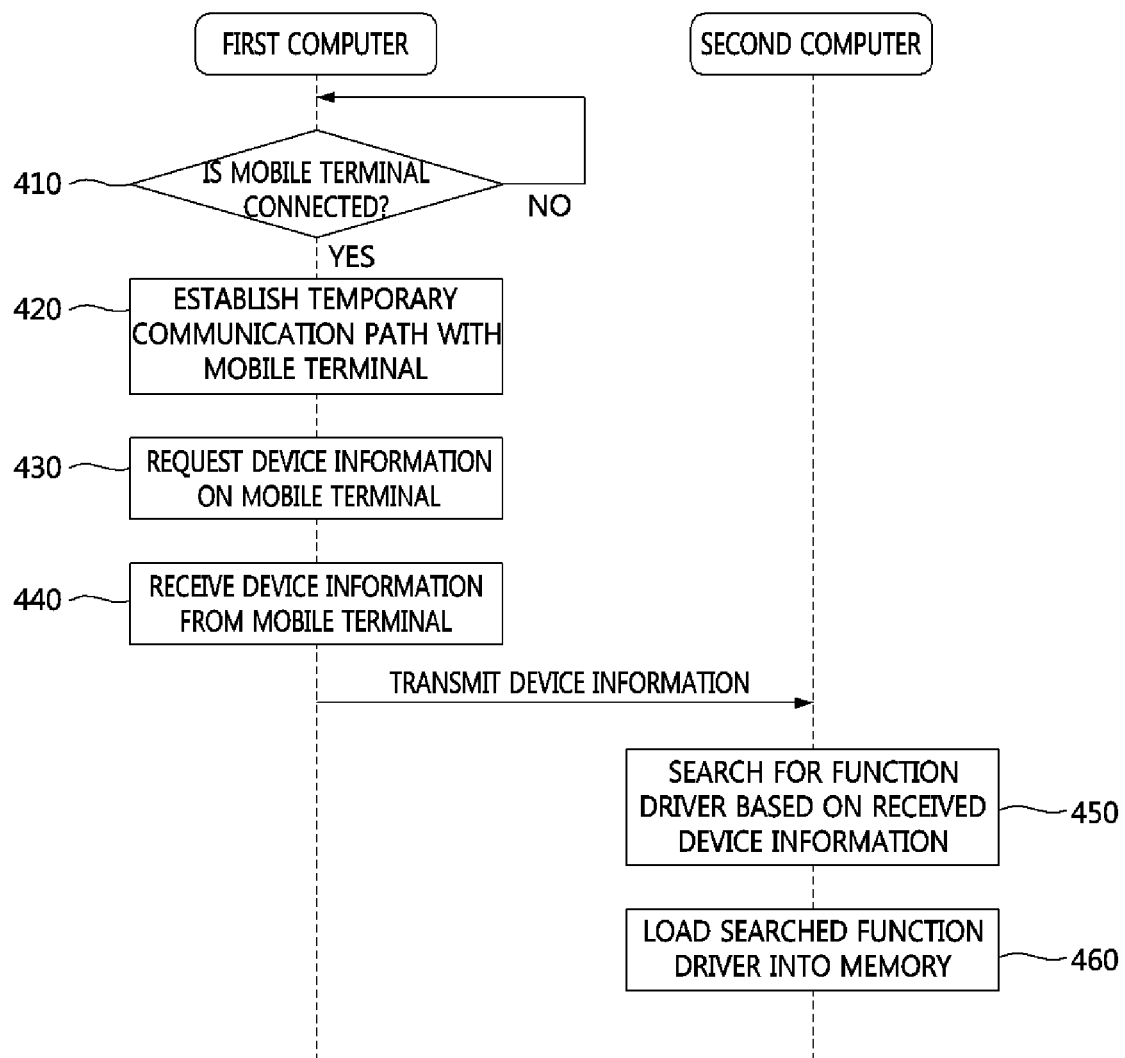
FIG. 3 is a flowchart illustrating a method of providing a remote device driver according to an example embodiment of the present invention.

FIG. 3 is a flowchart illustrating a method of providing a remote device driver according to an example embodiment of the present invention, that is, a process of building a remote device driver.

Referring to FIG. 3, a first computer determines whether a mobile terminal is connected to a USB hub (step 410). When it is determined that a mobile terminal is connected, the first computer establishes a temporary communication path between an end point of the mobile terminal and a second computer functioning as a physical host via a network (step 420).

Subsequently, the first computer requests device information from the mobile terminal through the established temporary communication path (step 430), and received device information from the mobile terminal in response to the request (step 440). Here, the device information may include a vendor ID, a product ID, etc. of the mobile terminal.

Subsequently, the first computer transmits the received device information on the mobile terminal to the second computer connected via the network. At this time, a specific application previously installed on the first computer may drive a communication interface to transmit the device information to the second computer.

Although not shown in FIG. 3, the first computer may be configured to search for the corresponding function driver on the basis of the device information received from the mobile terminal before transmitting the device information to the second computer, load the corresponding function driver into a memory when the corresponding function driver is searched for, and transmit the device driver to the second computer only when the corresponding function driver is not searched for.

The second computer receives the device information on the mobile terminal from the first computer, and searches for a function driver corresponding to the received device information (step 450). At this time, a specific application previously installed on the second computer may receive and provide the device information transmitted from the first computer to an OS through a virtual hub driver, and the OS may compare the provided device information with a system registry and search for a function driver.

Subsequently, the second computer reads and loads the searched function driver into a memory (step 460). At this time, when the corresponding function driver is not in the second computer, the second computer may obtain the corresponding function driver from a manufacturer server of the mobile terminal or a separate function driver database via a network.

Figure 4:
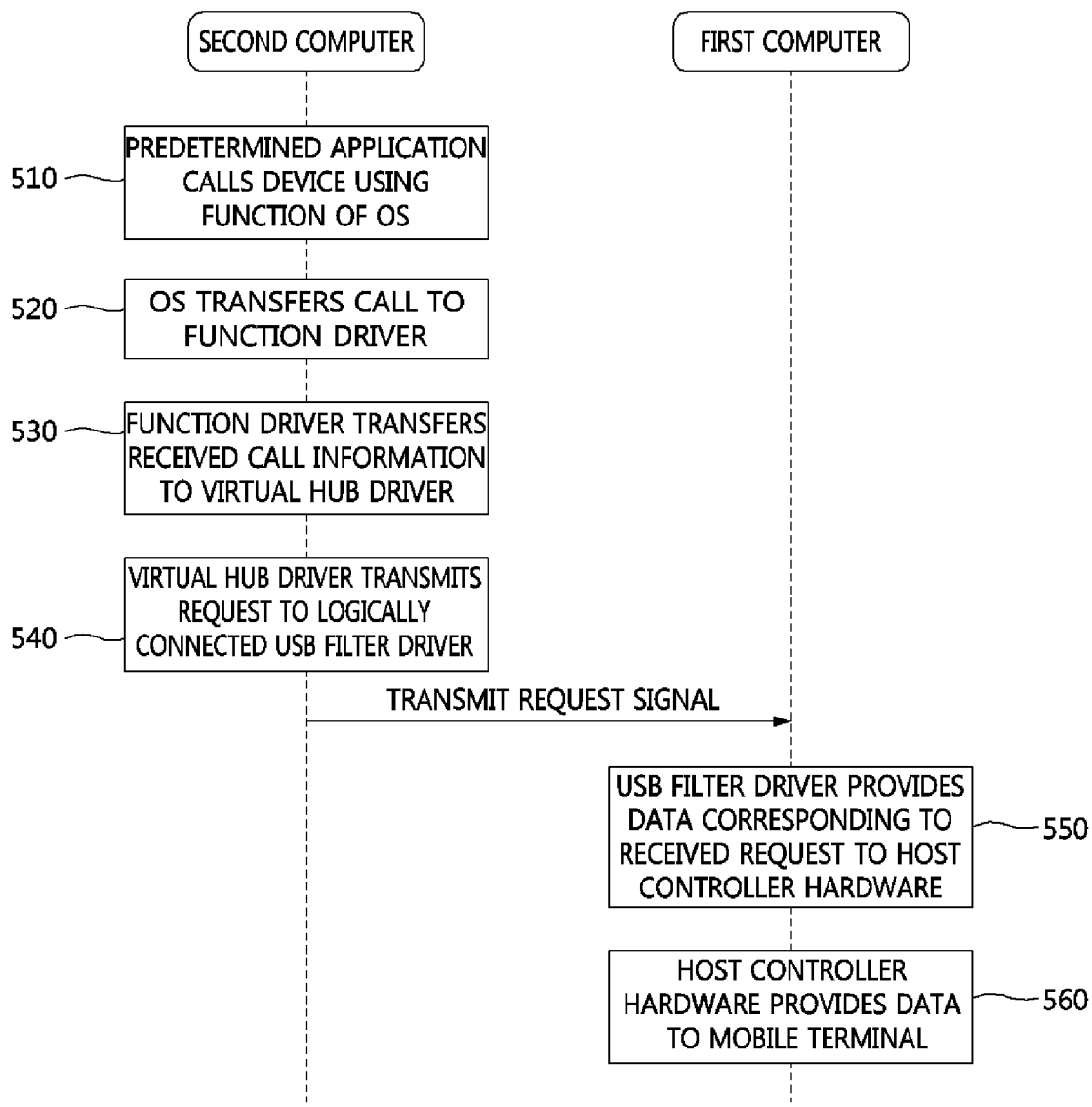
FIG. 4 is a flowchart illustrating a communication method using a remote device driver according to an example embodiment of the present invention.

FIG. 4 is a flowchart illustrating a communication method using a remote device driver according to an example embodiment of the present invention, that is, a communication process between a host and a device after a remote device driver building process as illustrated in FIG. 3 is finished.

Referring to FIG. 4, when a predetermined application of a second computer calls a USB device (i.e., a mobile terminal) using a specific function of an OS (step 510), the OS transfers the call to a function driver (step 520).

The function driver receiving the call from the OS provides call information to a virtual hub driver (step 530), and the virtual hub driver transmits a request to a USB filter driver of a logically connected first computer (step 540).

The USB filter driver of the first computer provides data corresponding to the request received from the virtual hub driver of the second computer to host controller hardware through a hub driver and a host controller driver in its lower layers (step 550), and the host controller hardware provides the data to the mobile terminal (step 560).

According to the above-described system and method for providing a remote device driver, a USB filter driver is on a first computer physically connected with a mobile terminal, and a virtual hub driver and a function driver are hierarchically built on a second computer at a remote location. Thus, the mobile terminal can be driven through the second computer at the remote location without installing the function driver directly in the first computer physically connected with the mobile terminal.

Also, the second computer can access and control the mobile terminal connected with the first computer as if the mobile terminal has been directly connected with the second computer. Thus, the above-described system and method can be used in various application fields such as remote control of a mobile terminal.

While the example embodiments of the present invention and their advantages have been described in detail, it should be understood that various changes, substitutions and alterations may be made herein without departing from the scope of the invention.

What is claimed is:

1. A system, comprising:
   a first device configured to request device information from a terminal connected through a universal serial bus (USB) interface, and transmit device information provided from the terminal in response to the request via a network; and
   a second device connected with the first device via the network, and configured to install a driver for driving the terminal on the basis of the device information on the terminal received from the first device,
   wherein a USB filter driver installed on the first device is configured to check whether or not the terminal is connected, and when the terminal is connected, establish a communication channel with the terminal, request the device information from the terminal, and receive the device information from the terminal, and
   wherein a virtual hub driver installed on the second device is configured to include a logical communication channel established to exchange data with the USB filter driver, and
   wherein a function driver installed on the second device is configured to perform communication limited to the terminal and manage communication of the virtual hub driver.

2. The system of claim 1, wherein the USB filter driver and the virtual hub driver between which the logical communication channel is established exchange the data through a specific application installed on each of the first device and the second device.

3. The system of claim 1, wherein, when a request to the terminal is provided from a predetermined application installed on the second device, the function driver transfers the provided request to the virtual hub driver, the virtual hub driver transmits the request to the USB filter driver through the logical communication channel, and the USB filter driver provides data corresponding to the request to the terminal through a hub driver and a host controller.

4. A method, comprising:
  when a terminal is connected to a first device through universal serial bus (USB),
  requesting, by a USB filter driver installed on the first device, device information from the terminal;
  transmitting, by the USB filter driver installed on the first device, device information received from the terminal to a second device; and
  installing, on the second device, a function driver of the terminal on the basis of the device information received from the USB filter driver installed on the first device,
  wherein the second device includes an installed virtual hub driver whose logical communication channel with the USB filter driver is established to exchange data with the USB filter driver, and
  wherein the function driver installed on the second device is configured to perform communication limited to the terminal and manage communication of the installed virtual hub driver.

5. The method of claim 4, wherein transmitting, at the first device, the device information received from the terminal to the second device includes transmitting, at a first application installed on the first device, the device information to the second device.

6. The method of claim 5, wherein loading, at the second device, the function driver of the terminal on the basis of the device information received from the first device includes:
  receiving, at a second application installed on the second device, the device information from the first application and providing the received device information to an operating system (OS);
  searching for, at the OS, the function driver corresponding to the device information; and
  loading, at the OS, the searched function driver into a memory.

* * * * *